(12) United States Patent
Chamorro et al.

(10) Patent No.: US 7,751,141 B2
(45) Date of Patent: *Jul. 6, 2010

(54) MANAGEMENT OF DATA CARTRIDGES IN MULTIPLE-CARTRIDGE CELLS IN AN AUTOMATED DATA STORAGE LIBRARY

(75) Inventors: German A. Chamorro, Vail, AZ (US);
Michael P. McIntosh, Tucson, AZ (US);
Shawn M. Nave, Ossining, NY (US);
Mark D. Schultz, Ossining, NY (US);
Harley C. Witt, Vail, AZ (US);
Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/116,175

(22) Filed: May 6, 2008

(65) Prior Publication Data

US 2009/0147394 A1 Jun. 11, 2009

Related U.S. Application Data

(63) Continuation of application No. 11/374,504, filed on Mar. 13, 2006, now Pat. No. 7,505,224.

(51) Int. Cl.
*G11B 19/02* (2006.01)

(52) U.S. Cl. ........................................ 360/69; 360/92.1

(58) Field of Classification Search ........................ None
See application file for complete search history.

(56) References Cited

U.S. PATENT DOCUMENTS

| | | | |
|---|---|---|---|
| 3,805,970 A | 4/1974 | Eash | |
| 4,042,096 A * | 8/1977 | Smith | 211/85.18 |
| 4,636,888 A | 1/1987 | Sidebottom | |
| 4,811,318 A | 3/1989 | Laufer | |
| 4,991,041 A | 2/1991 | Grant | |
| 5,011,015 A * | 4/1991 | Ziegler et al. | 206/387.12 |
| 5,508,859 A * | 4/1996 | Hu et al. | 360/92.1 |
| 5,652,682 A * | 7/1997 | Elliott | 360/92.1 |
| 5,740,061 A | 4/1998 | Dewey et al. | |
| 6,381,089 B1 * | 4/2002 | Helmick et al. | 360/92.1 |
| 6,781,789 B2 | 8/2004 | Ostwald | |

(Continued)

FOREIGN PATENT DOCUMENTS

EP 0613143 A2 8/1994

(Continued)

*Primary Examiner*—Jason C Olson
(74) *Attorney, Agent, or Firm*—Dan Shifrin

(57) ABSTRACT

In an automated library, data cartridges, such as magnetic tape cartridges, are stored in storage cells and accessed by data storage drives. An accessor with a gripper transports cartridges between storage cells and storage drives. Cartridges are prioritized according to their relative importance. A processor manages the placement of the cartridges in cells by having higher priority cartridges stored closer to the front of multi-cartridge cells than cartridges with a lower priority. Cartridges with a higher priority may also be stored closer to a storage drive than cartridges with a lower priority. A pusher may be used to push cartridges towards the front of multi-cartridge cells with an empty position to enable the gripper to reach the front cartridge.

13 Claims, 10 Drawing Sheets

U.S. PATENT DOCUMENTS

| | | |
|---|---|---|
| 6,816,335 B2 | 11/2004 | Hoelsaeter et al. |
| 6,956,715 B2 | 10/2005 | Mueller et al. |
| 7,475,205 B2 * | 1/2009 | McIntosh et al. ............ 711/161 |
| 2003/0063411 A1 | 4/2003 | Ostwald |
| 2004/0218305 A1 | 11/2004 | Donkin et al. |

FOREIGN PATENT DOCUMENTS

| | | |
|---|---|---|
| EP | 0725398 A2 | 8/1996 |
| JP | 02078053 | 3/1990 |

* cited by examiner

MANAGEMENT OF DATA CARTRIDGES IN MULTIPLE-CARTRIDGE CELLS IN AN AUTOMATED DATA STORAGE LIBRARY

RELATED APPLICATION DATA

The present application is a continuation application of, and claims the priority benefit of, commonly-assigned and co-pending U.S. application Ser. No. 11/374,504, entitled MANAGEMENT OF DATA CARTRIDGES IN MULTIPLE-CARTRIDGE CELLS IN AN AUTOMATED DATA STORAGE LIBRARY, filed on Mar. 13, 2006, which application is hereby incorporated herein by reference in its entirety.

The present application is also related to commonly-assigned and co-pending U.S. application Ser. No. 11/373,963, entitled CARTRIDGE RETENTION IN AN AUTOMATED DATA STORAGE LIBRARY, and U.S. application Ser. No. 11/374,190, entitled DATA STORAGE CARTRIDGE GRIPPER WITH DEEP-REACH, filed on the filing date hereof, which applications are incorporated herein by reference in their entireties.

TECHNICAL FIELD

This invention relates generally to automated data storage libraries, and in particular, to managing data cartridges in multiple-cartridge cells in an automated data storage library.

BACKGROUND ART

Automated data storage libraries are known for providing cost effective storage and retrieval of large quantities of data. The data in automated data storage libraries is stored on data storage media that are, in turn, stored on storage cells, shelves or the like inside the library in a fashion that renders the media, and its resident data, accessible for physical retrieval. Such media is commonly termed "removable media". Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a data storage cartridge, also referred to herein as a cartridge. An example of a data storage cartridge that is widely employed in automated data storage libraries for mass data storage is a magnetic tape cartridge.

In addition to data storage media, automated data storage libraries typically contain one or more data storage drives that store (write) data to and/or retrieve (read) data from the data storage media. Transport of cartridges between storage cells and storage drives is typically accomplished by one or more robot accessors. Such accessors have grippers for physically retrieving a selected cartridge from a storage cell within the automated data storage library and transporting the cartridge to a storage drive by moving in the horizontal (X) and/or vertical (Y) directions. Additionally, many libraries now include data drives of different types and the libraries must accommodate multiple types of cartridges to be used in the different drives.

Customer demands for storage have increased. One method for satisfying such demands has been the development of increased storage media density, along with new data drives, such that more data can be stored in the same amount of customer floor space. While increased media density has helped alleviate the forgoing demand, the need for increased storage has continued. While storage cells have traditionally been designed to hold a single data cartridge, a more recent development has been storage cells designed to be deep enough to hold two or even more data cartridges. Thus, with only an incremental increase in the library footprint, the data density of a library may be increased by a factor of two or more.

When a cell is deep enough for a single cartridge, the cartridge is always within reach of the accessor gripper. However, when a cell holds more than one cartridge and the front cartridge has been removed, it is necessary for the remaining cartridges to be moved forward to be reachable by the gripper. This can be accomplished by the use of a spring located in the rear of the cell which pushes the cartridges forward or by the use of an external mechanism which can reach into the cell and push the cartridges forward.

In a multi-cartridge cell, it requires extra time to remove a desired cartridge which is not at the front of the cell. Intermediate cartridges must first be removed and placed at a temporary location before the desired cartridge may be brought to the front of the cell and removed. The other cartridges must then be brought back to the cell and inserted. Such actions slow the overall access time to data stored on the cartridge.

Consequently, a need remains for more efficient management of data cartridges in an automated storage library having multiple-cartridge cells.

SUMMARY OF THE INVENTION

The present invention provides an automated data storage library with a data drive for reading/writing data from/to media within data cartridges. The library includes a plurality of multi-cartridge storage cells arranged in a two-dimensional array, each cell having a front opening and a back, with data cartridges being retained in positions in a cell from a front position to a rear position. A gripper is positionable to insert cartridges into, and remove cartridges from, the front openings of the cells and transporting cartridges within the library. The library further includes an automated pusher device, comprising means for being positioned proximate to a selected cell and means for moving a selected cartridge in the selected cell from a first position forward to the front position. In one embodiment, the pusher device includes a lead screw and a tab within a storage cell used to push cartridges towards the front of the cell. In another embodiment, the pusher device includes an extendable member which extends into the back of a selected cell and pushes the cartridges forward.

DETAILED DESCRIPTION OF THE PREFERRED EMBODIMENT

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
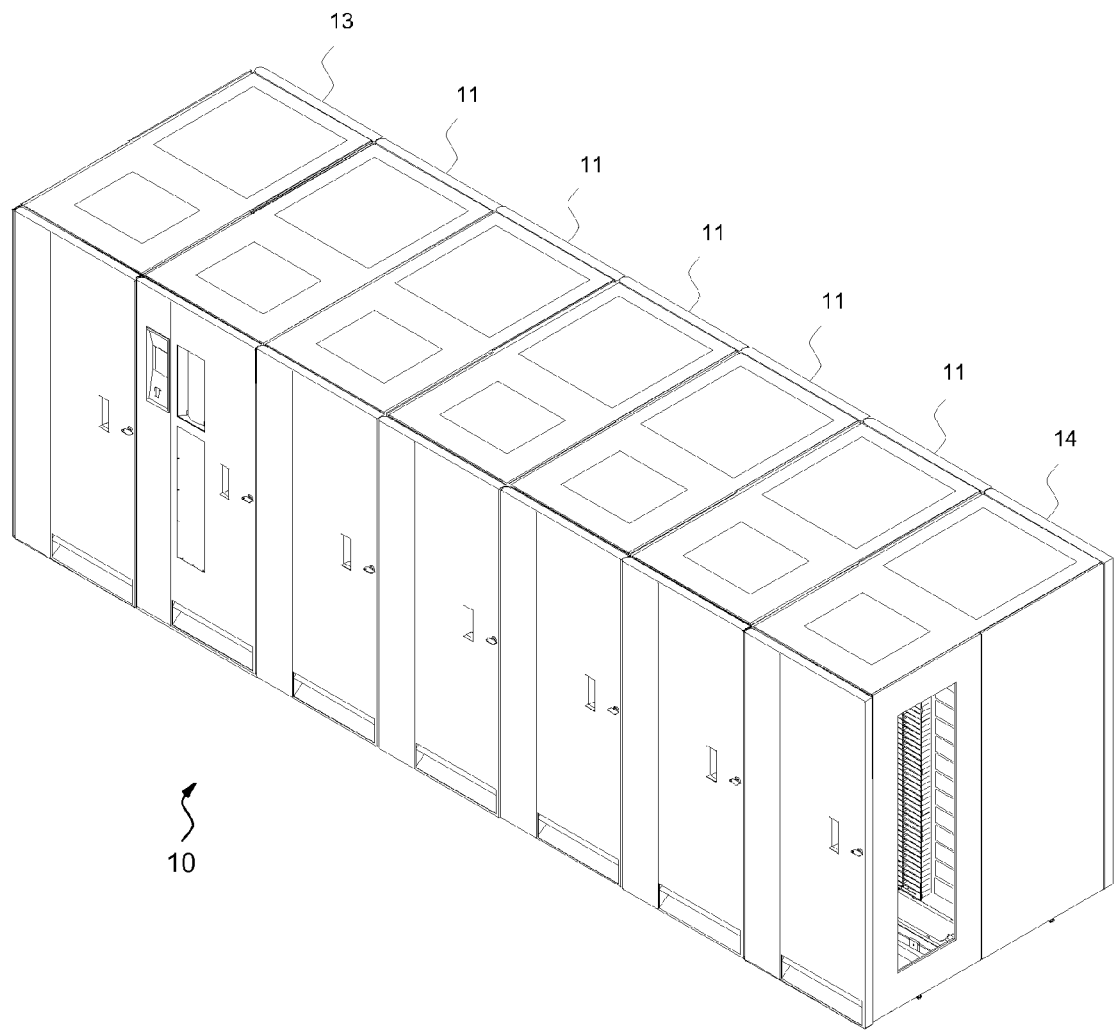
FIG. 1 is an isometric view of an automated data storage library adaptable to implement an embodiment of the present invention, with the view specifically depicting a library having a left hand service bay, multiple storage frames and a right hand service bay.
Figure 2:
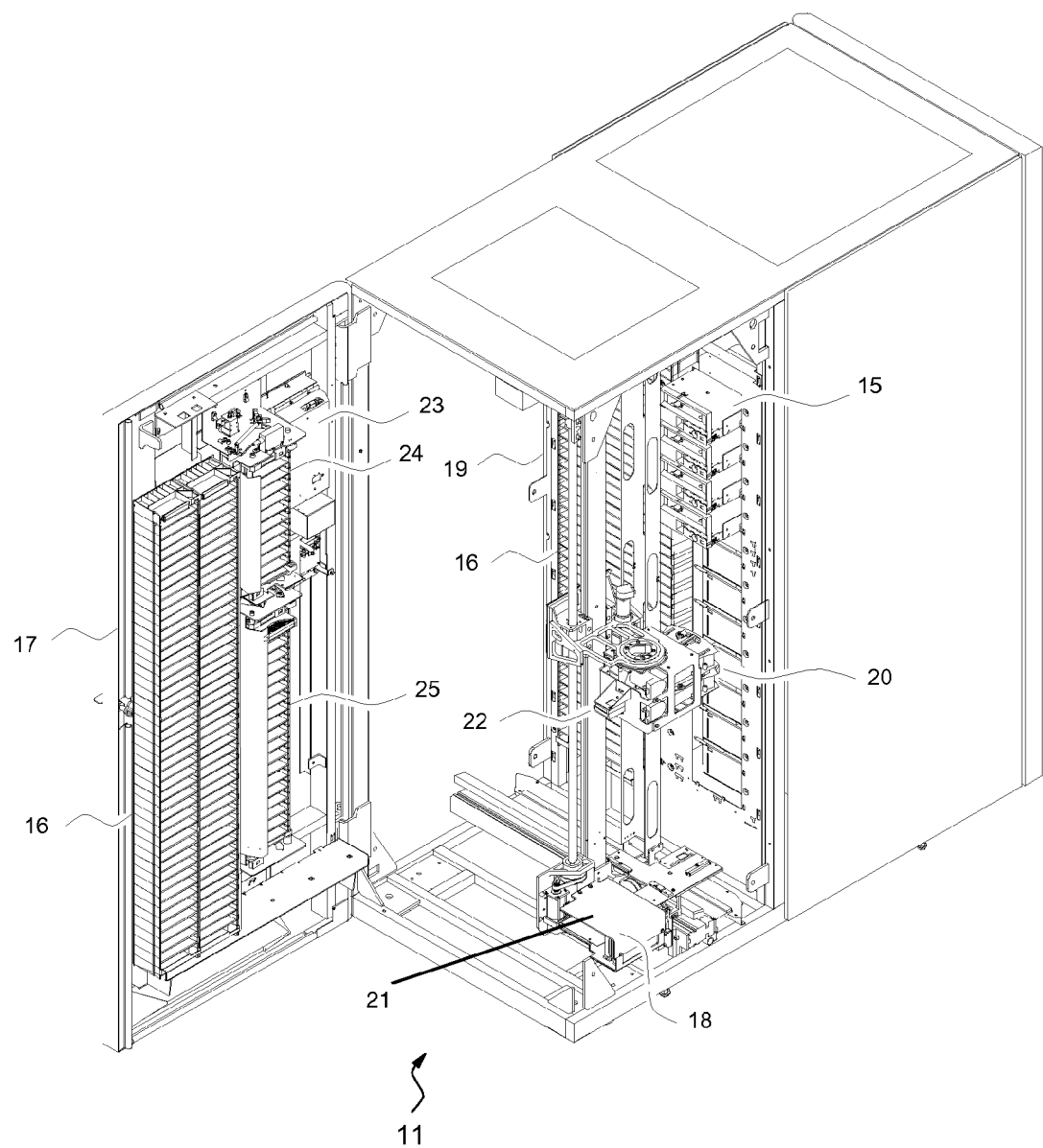
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 with a housing in which data storage cartridges containing data storage media (not shown) are stored in and retrieved from storage cells 16. It is noted that references to "data storage media" herein also refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16, on front wall 17 and rear wall 19 for storing data cartridges that contain data storage media; at least one data storage drive 15 for reading and/or writing data from/to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data from/to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage cartridges to be inserted into the library and/or removed from the library without disrupting library operation. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a base assembly 21, a gripper assembly 20 for gripping one or more data storage media and may include a bar code scanner or other reading system 22, such as a cartridge memory reader or similar system, mounted on the gripper 20, to "read" identifying information about the data storage media.

Figure 3:
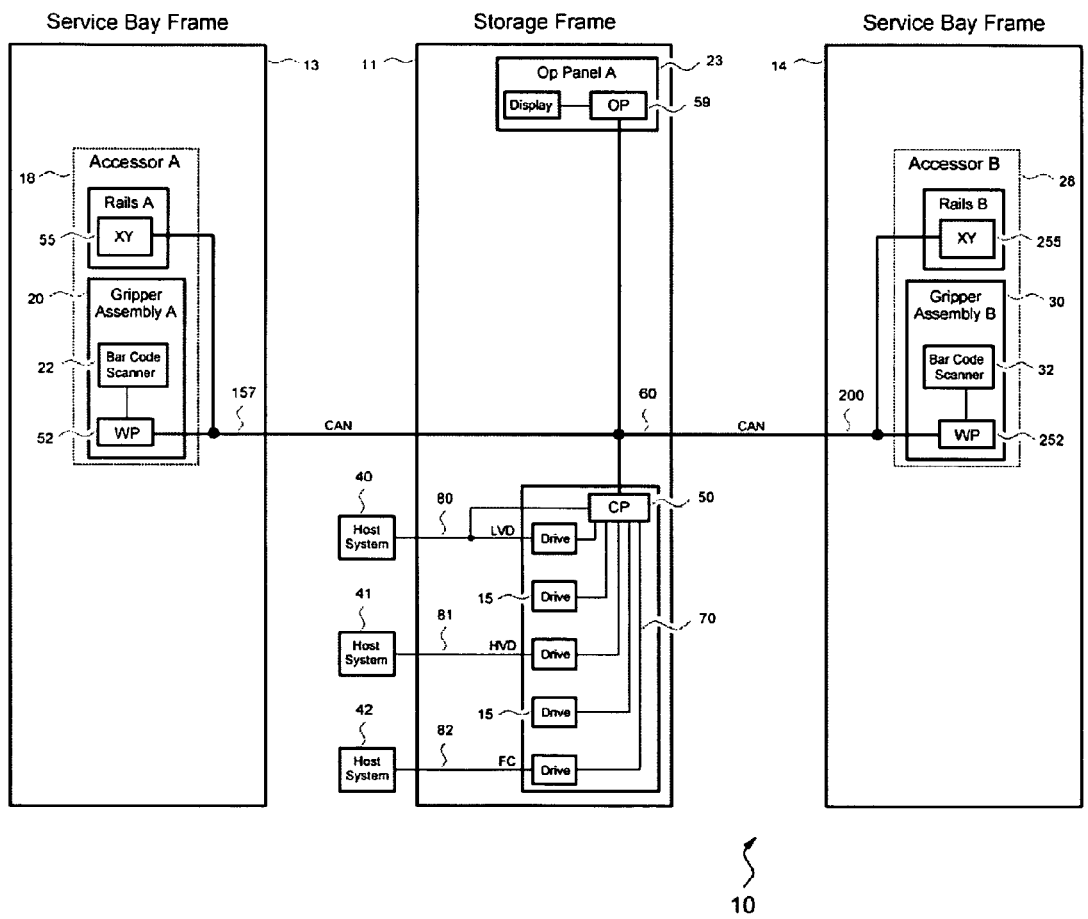
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the present invention, is the IBM 3584 UltraScalable Tape Library. For a fuller understanding of a distributed control system incorporated in an automated data storage library, refer to U.S. Pat. No. 6,356, 803, which is entitled "Automated Data Storage Library Distributed Control System," which is incorporated herein by reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may share a common horizontal rail and have independent vertical rails. The first accessor 18 and the second accessor 28 are described as first and second for descriptive purposes only and this description is not meant to limit either accessor to an association with either the left hand service bay 13, or the right hand service bay 14.

In the library 10 illustrated as an example in FIG. 3, first accessor 18 and second accessor 28 move their grippers in at least two directions, called the horizontal "X" direction and vertical "Y" direction, to retrieve and grip, or to deliver and release the cartridges at the storage cells 16 and to load and unload the cartridges at the data storage drives 15.

The library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The library 10 is controlled by a distributed control system receiving the logical commands from hosts, determining the required actions, and converting the actions to physical movements of first accessor 18 and/or second accessor 28.

In the library 10, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives 15 and with host systems 40, 41 and 42. Alternatively, the host systems 40, 41 and 42 may be directly coupled to the communication processor node 50, at input 80 for example, or to control port devices (not shown) which connect the library 10 to the host system(s) with a library interface similar to the drive/library interface. As is known to those of skill in the art, various communication arrangements may be employed for communication with the hosts 40, 41 and 42 and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage cells 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage cartridges, and an XY processor node 255 may be provided and may be located at an XY system of the second accessor 28. The second accessor 28 may run on the same horizontal mechanical path as first accessor 18 or on an adjacent path. The control system additionally may also comprise an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, the network 157 may not be associated with the left hand service bay 13 and the network 200 may not be associated with the right hand service bay 14. Depending on the design of the library and the particular needs of the customer, it may not be necessary to have a left hand service bay 13 and/or a right hand service bay 14.

Figure 4:
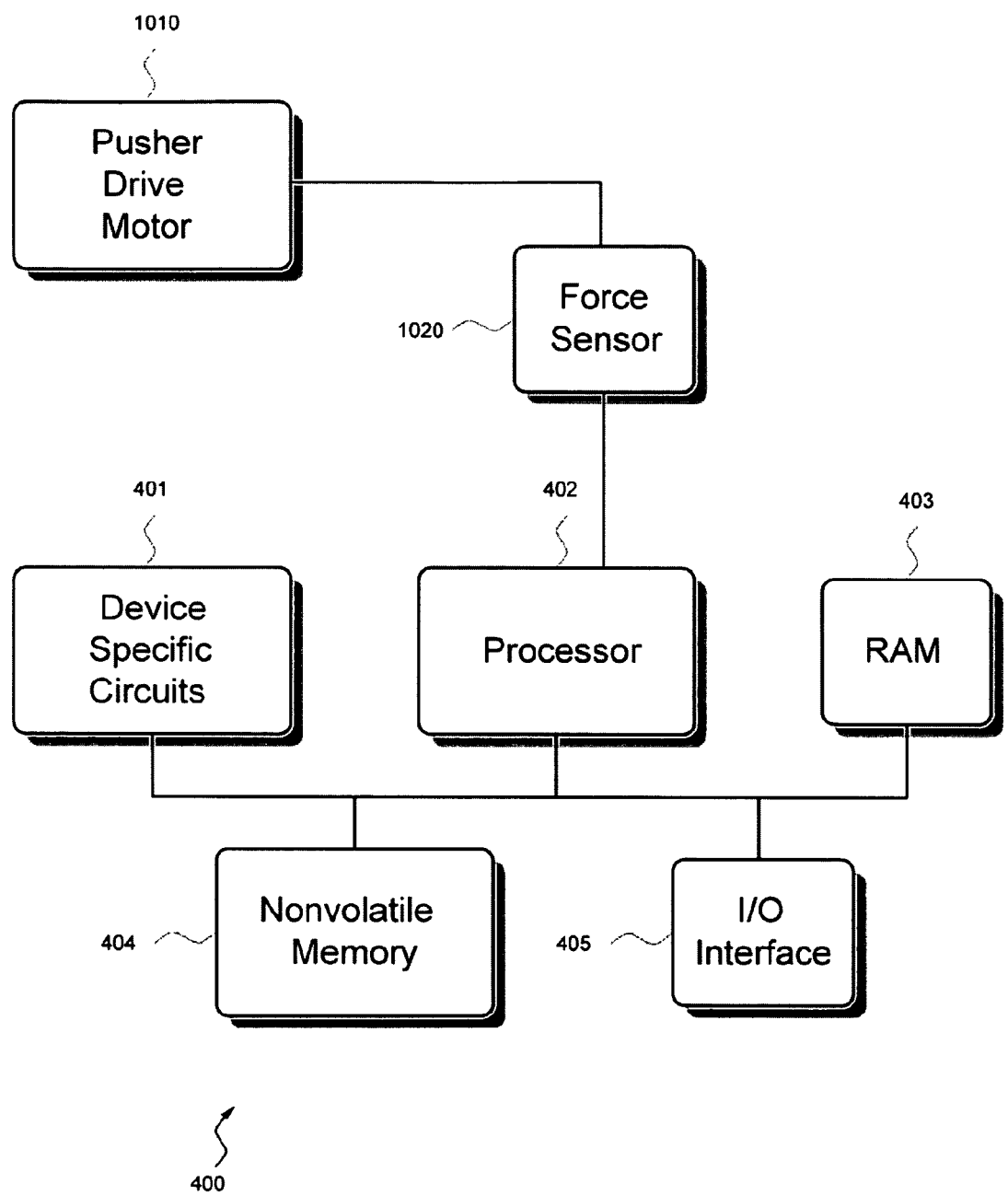
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not be limited to, an embedded system, a distributed control system, a personal computer, or a workstation, etc. Alternatively, one of the processor nodes 50, 52, 55, 59, 252, 255 may comprise a controller. In such a configuration, one of the processor nodes comprises the controller while any other processor nodes may work under the direction of the controller. Still further, two or more of the processor nodes 50, 52, 55, 59, 252, 255 may comprise a controller. In this further configuration, two or more processor nodes comprise the controller while any other processor nodes may work under the direction of the controller. Essentially, the term "controller" as used herein is intended in its broadest sense as a device or system that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), Fibre Channel, SCSI (Small Computer Systems Interface), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Figure 5A:
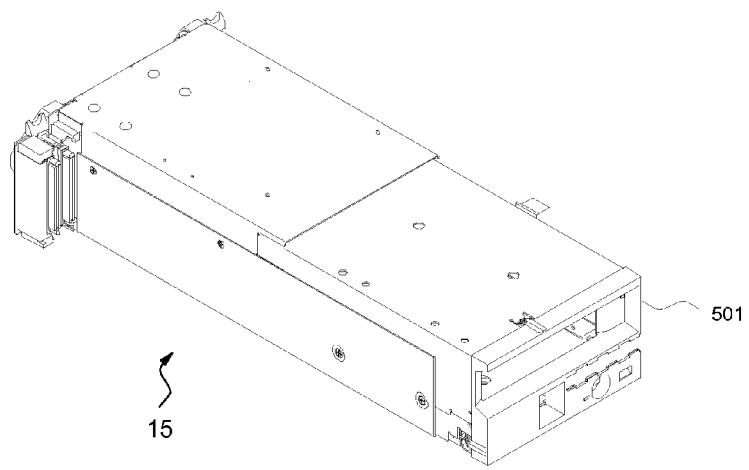
FIGS. 5A and 5B show front and rear isometric views, respectively, of a data storage drive adaptable to implement an embodiment of the present invention.
Figure 5B:
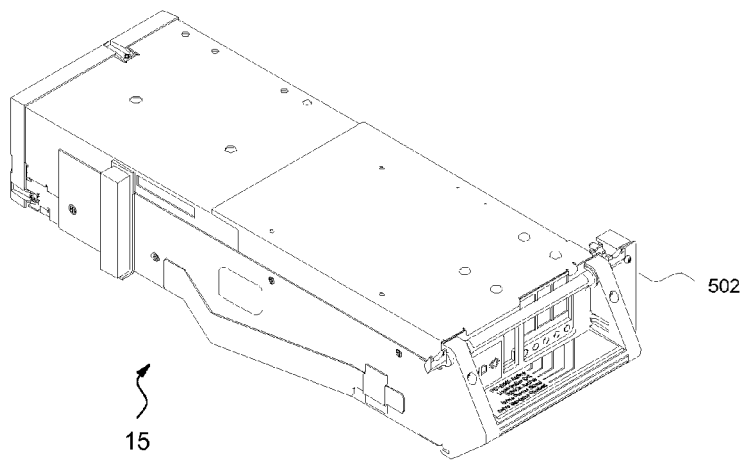

FIGS. 5A and 5B illustrate the front 501 and rear 502, respectively, of a data storage drive 15. In the example of FIGS. 5A, 5B, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
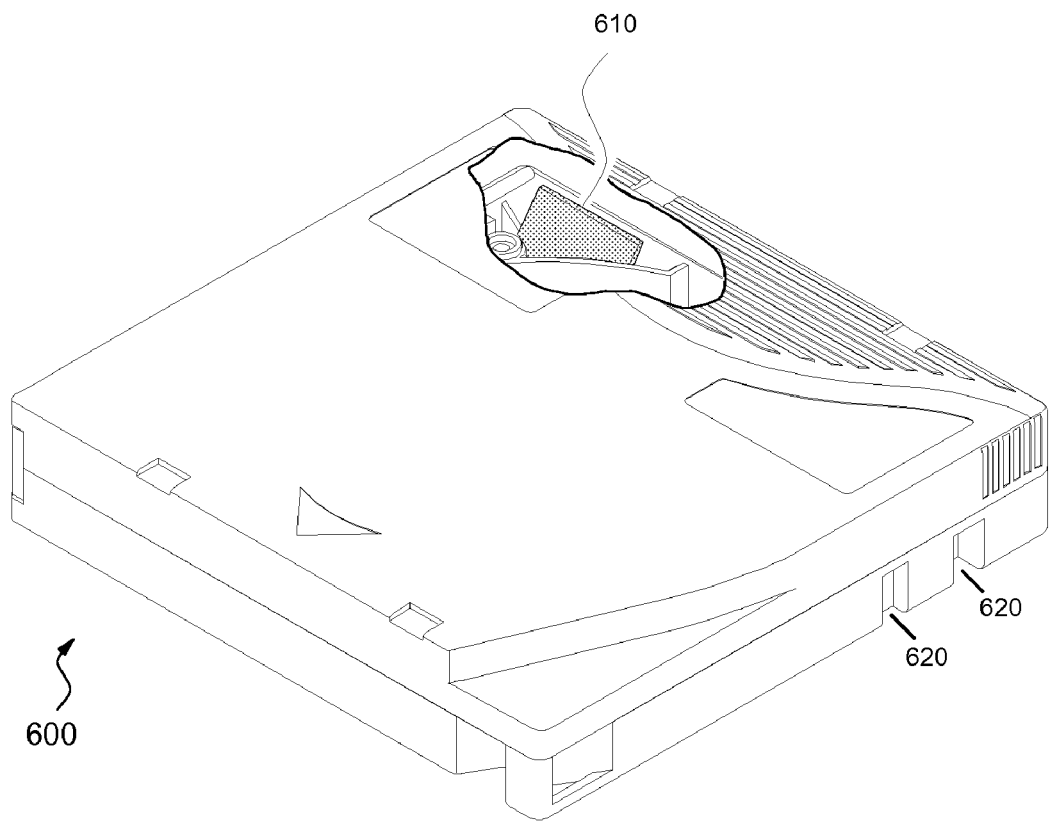
FIG. 6 is an isometric view of a data storage cartridge adaptable to implement an embodiment of the present invention with a portion cut-away to show a cartridge memory.

FIG. 6 illustrates an embodiment of a data storage cartridge 600 with a cartridge memory 610 shown in a cutaway portion of the Figure. Information may be written to as well as read from the cartridge memory 610. Such information may include, but is not limited to, a cartridge identifier, the cartridge type and the media type. During normal operations, a cartridge memory reader 22 (FIG. 2), which may be located on the accessor or gripper, is able to read the contents of the cartridge memory 610 when it is in close proximity thereto and can thereby confirm, for example, that the cartridge is the correct one to grip and transport to a storage drive. The cartridge memory may also be used as part of an inventory update when the cartridge is inserted into the library.

Figure 7:
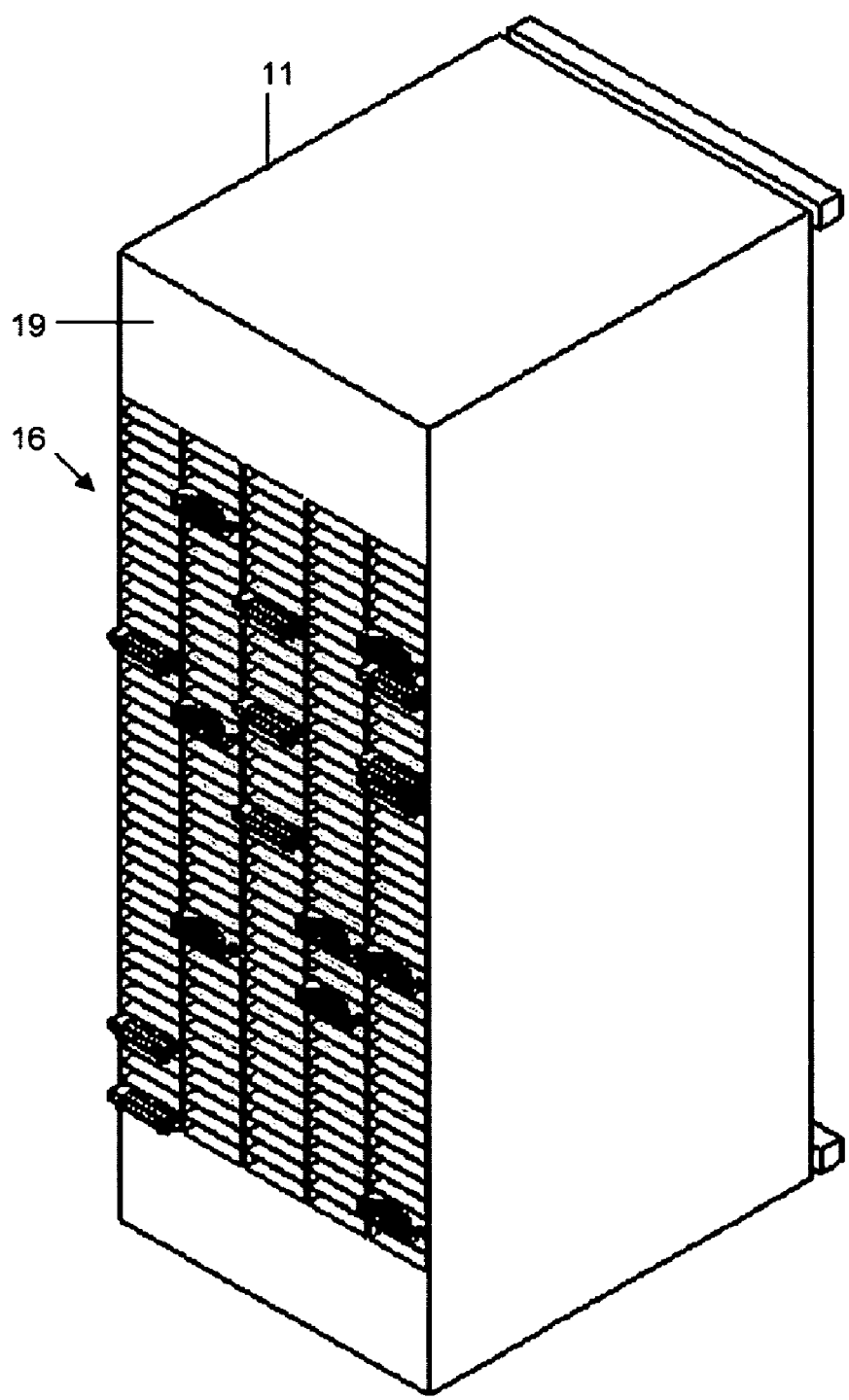
FIG. 7 is an front isometric view of the rear portion of a library frame.
Figure 8:
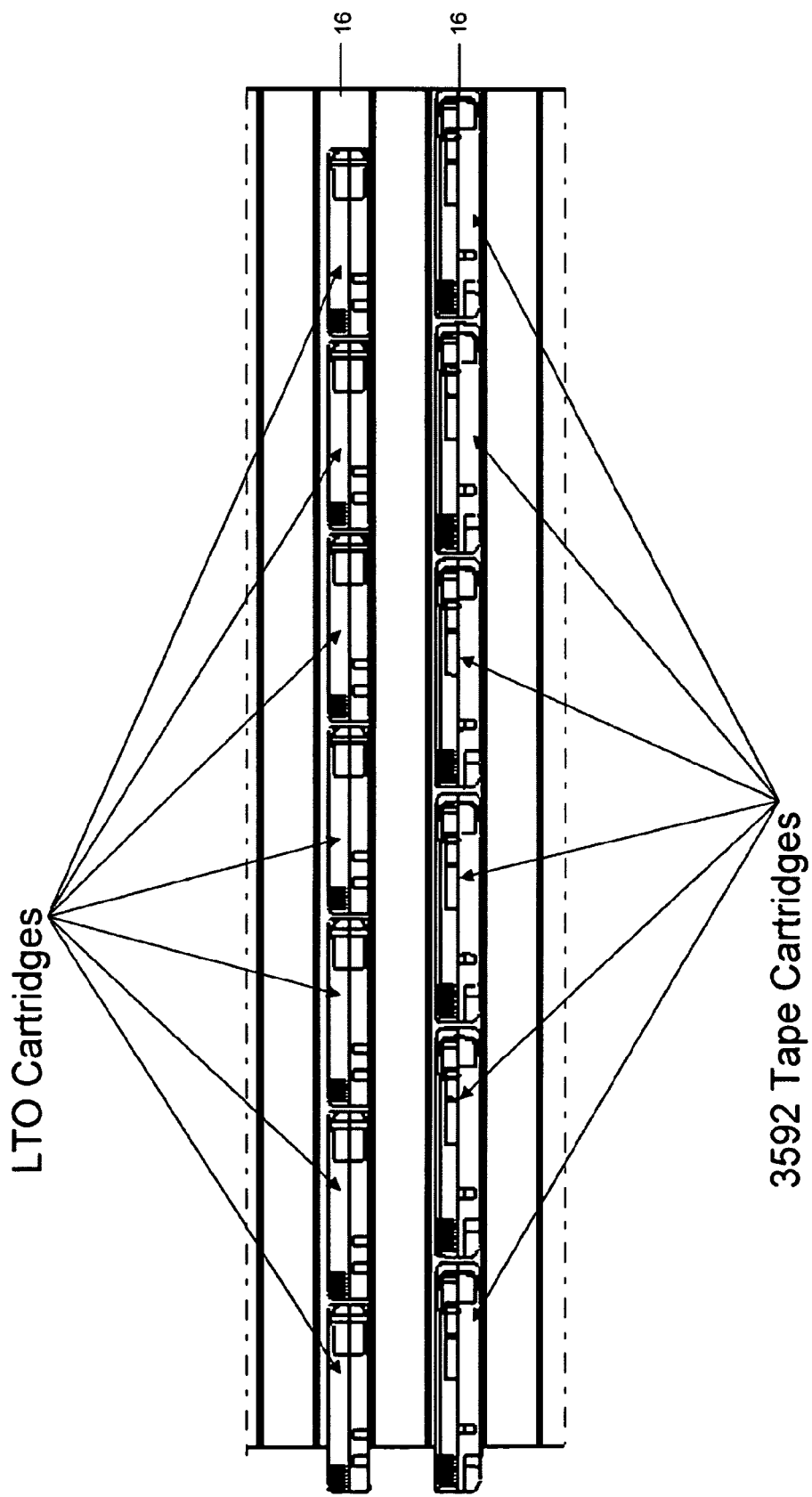
FIG. 8 is a cut-away side view of multi-cartridge cells in a library frame in which data cartridges of two different types have been stored.

FIG. 7 is a front isometric view of the rear portion of a frame 11 of an automated data storage library 10 adaptable to implement an embodiment of the present invention. The rear portion includes the rear wall 19 of the inside of the frame 11 and an array of storage cells 16. In order to increase the efficiency in the use of customer floor space, the cells 16 are deep enough to store more than one data cartridge. Moreover, in one embodiment, the cells 16 have sufficient width and height to accommodate more than one type of cartridge, such as LTO cartridges and IBM® 3592 cartridges. For example, as illustrated in FIG. 8, a cell may hold up to seven LTO cartridges or up to six of the larger 3592 cartridges. To meet the differing needs of various customers with even greater efficiency, a single cell may hold both types of cartridges simultaneously.

Figure 9:
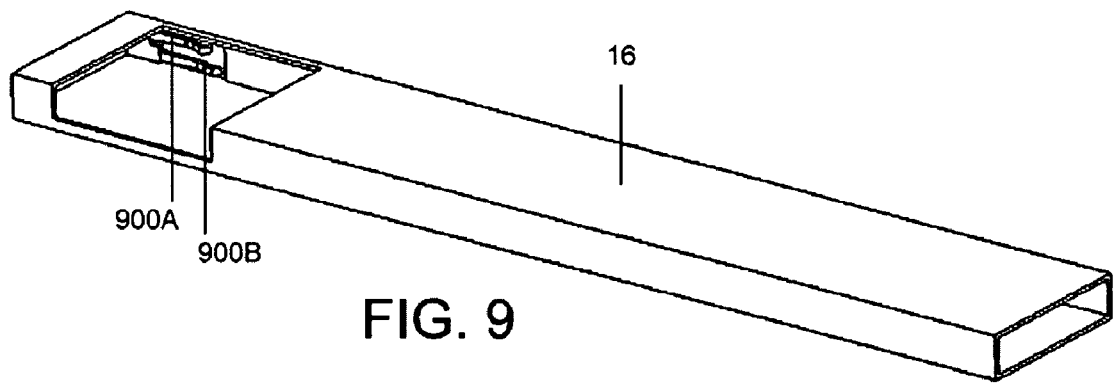
FIG. 9 illustrates a multiple detent finger of the present invention.

The cartridge 600 also includes notches 620 which are engaged by a biased detent finger protruding from the side of the cell 16 in prior art libraries to retain the cartridge 600 and prevent it from accidentally falling out of a storage cell 16. However, a notch on one type of cartridge, the LTO cartridge for example, may be located at a different location than a notch on a different type of cartridge, the 3592 cartridge for example. Therefore, the detent finger in the cell 16 may only engage the notch of one type of cartridge. Referring to FIG. 9, to further accommodate cartridges of different types, the present invention provides with two (or more) biased detent tabs 900A, 900B independently located in the cell 16 to engage the notches of two (or more) different types of cartridges 600.

The present invention also provides a cartridge management system with tiered or prioritized storage. Cartridges are assigned priority levels by a processor 402 based upon the importance of the data contained therein or the frequency with which data on the cartridges needs to be accessed. Thus, data which is more important will be given a higher priority and be assigned to a higher tier than other data. Alternatively, or in addition, data which is accessed more frequently will be given a higher priority and be assigned to a higher tier than other data. In one embodiment, cartridges assigned to lower tiers may be inserted into multi-cartridge cells first, followed by cartridges assigned to higher tiers. Thus, cartridges in the highest tier are preferably at the front of multi-cartridge cells and more easily and quickly accessible to the gripper 20. Access to cartridges in the lower tiers takes longer, but because the data contained therein is less important or less frequently accessed, the delay is outweighed by the greater accessibility of higher tiered cartridges. In another embodiment, cartridges assigned to the higher tiers may be stored in cells which are closest to the data drives 15 while cartridges assigned to lower tiers may be stored in cells which are farther from the drive 15. A library processor 402 may also employ both embodiments in combination.

In a variation on the tiered management approach of the present invention, operations in which a cartridge assigned to a higher tier is to be accessed may be given a higher priority by the processor 402 than operations relating to a cartridge assigned to a lower tier. Thus, an operation on a lower tiered cartridge may be interrupted or delayed pending the completion of an operation on a higher tiered cartridge.

Figure 10:
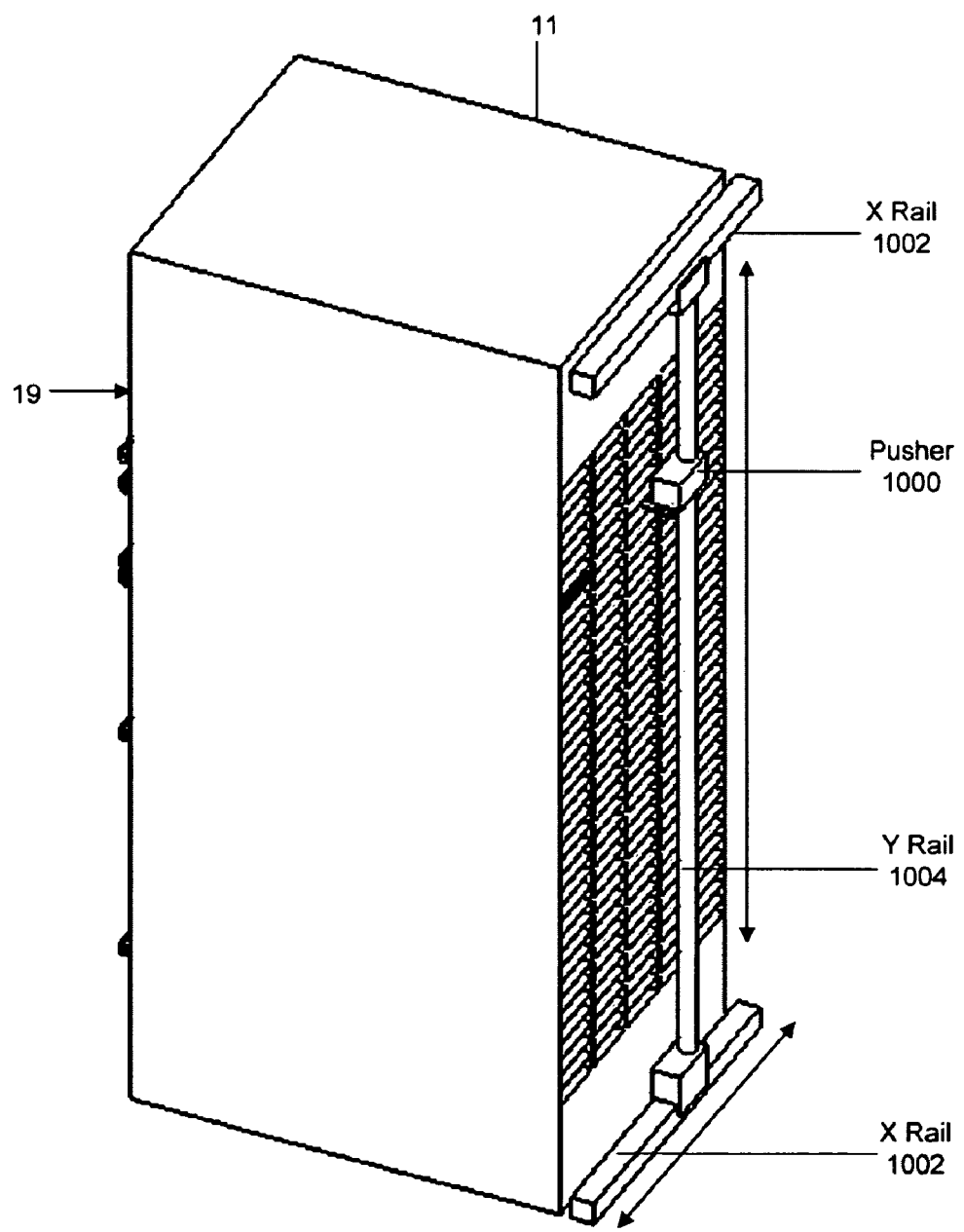
FIG. 10 is a rear isometric view of the rear portion of the library frame of FIG. 7, including a pusher to push cartridges towards the front of multi-cartridge cells.

In order to access cartridges which are closer to the rear of a multi-cartridge cell when a cartridge in the front position has been removed, the present invention provides a pusher mechanism for actively moving cartridges forward. FIG. 10 is an isometric view of the rear portion of a frame 11 showing the back of the rear portion. A pusher 1000 rides on one or two X-axis rails 1002 for horizontal movement and a Y-axis rail 1004 for vertical movement. One pusher 1000 may be incorporated into each frame 11 or a single pusher 1000 may be used to span multiple frames 11. In much the same way that an accessor 18 and associated gripper 20 are directed to a specific cell opening on the front side 19, the pusher may also be directed, such as by a processor 402, with XY coordinates to the back of a specific cell. In a further embodiment, the present invention may incorporate redundancy by utilizing dual pushers capable of accessing the same cells. If both travel up and down on a single vertical rail 1004, a first may move high enough or low enough to be out of the way of the second yet be able to take over if the second pusher fails. In addition, both pushers may be directed to operate on different cells simultaneously.

Figure 11:
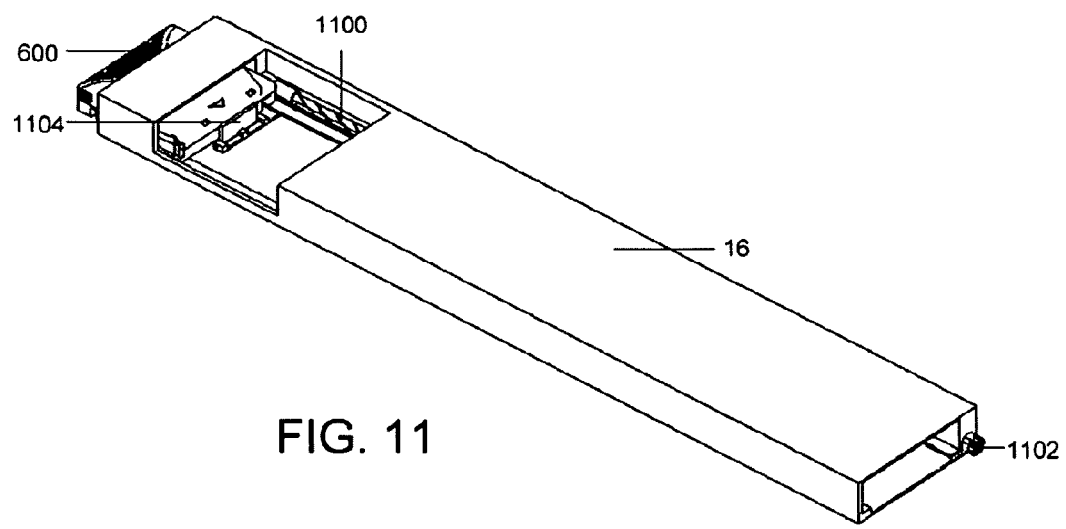
FIG. 11 is an isometric view of the top and side of a storage cell with a portion cut-away to illustrate a lead screw for moving cartridges forward within the cell.
Figure 12:
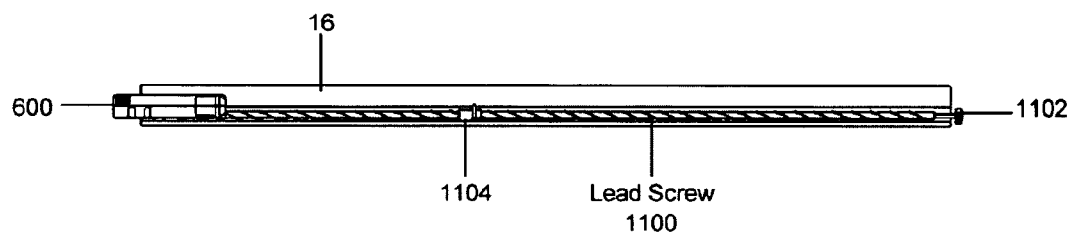
FIG. 12 is a cross-sectional side view of a cell with a lead screw.

In one embodiment, illustrated in FIGS. 11 and 12, the pusher mechanism 1000 engages a lead screw 1100 through a coupler 1102. The lead screw 1100 runs along one side of the inside of a cell 16, for substantially the length of the cell 16. FIG. 12 illustrates a cross-sectional side view of the cell 16 with a cartridge 600 at the front end and the coupler 1102 at the back end. In operation, the pusher 1000 is directed into position at the back of the desired cell 16 and a motor engages the coupler 1102. When the motor is activated, the lead screw 1100 rotates within the cell 16 and a plate 1104, threaded onto the lead screw 1100, and moves towards the front opening of the cell 16 pushing the cartridge(s) 600 before it. When the cartridge is pushed far enough, the motor is reversed to move the plate 1104 towards the rear of the cell 16, allowing additional cartridges 600 to be inserted through the front opening. The pusher 1000 may then disengage and move to another cell.

Figure 13:
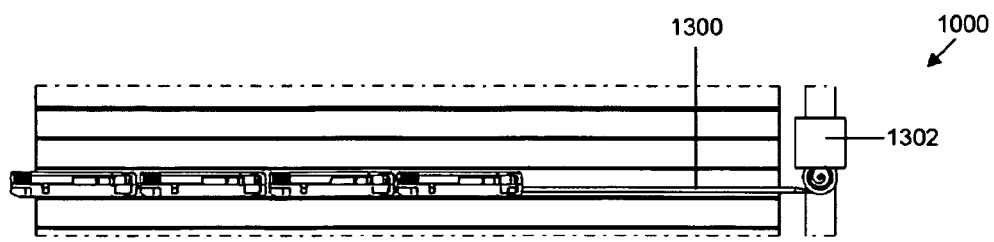
FIG. 13 is a cross-sectional side view of another embodiment of a cartridge pusher.

In another embodiment, illustrated in FIG. 13, the pusher 1000 includes a telescoping rod 1300, functionally similar to an automatic automobile radio antenna. In operation, the pusher 1000 is directed into position at the back of the desired cell 16 and motor 1302 on the pusher 1000 is activated. The rod 1300 extends into the rear of the cell 16 and pushes one or more cartridges 600 toward the front opening of the cell 16. When the cartridges are pushed far enough, the motor 1302 is reversed and the rod 1300 retracts, freeing the pusher 1000 to move to another cell.

To prevent data cartridges from being pushed out of the front of a cell, the present invention further includes a cartridge-position detection system. As the drive motor 1010 (FIG. 4) of the pusher 1000 (in the lead screw embodiment or the extendable rod embodiment) pushes one or more cartridges 600 towards the front of the cell 16, a certain amount of resistance is encountered. When the notch in the front cartridge is engaged by a detent tab, the resistance increases. A force sensor 1020 coupled to a processor 402 may sense the electrical resistance or current in the drive motor 1010. When the sensed resistance increases to predetermined value, indicating that the front cartridge 600 has been pushed far enough within the cell 16 and engaged by the detent, the processor 402 directs the drive motor 1010 to turn off or reverse.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing data cartridges in an automated data storage library.

What is claimed is:

1. An automated data storage library with a data drive for reading/writing data from/to media within data cartridges, the library comprising:
   a plurality of multi-cartridge storage cells arranged in a two-dimensional array, each cell having a front opening and a back, data cartridges being retained in positions in a cell from a front position to a rear position;
   a gripper positionable to insert cartridges into, and remove cartridges from, the front openings of the cells and transporting cartridges within the library; and
   an automated pusher device, comprising:
      a lead screw within a selected cell and having a first end at the back of the selected cell and a second end proximate to the front opening of the selected cell;
      a tab threaded onto the lead screw and movable along the lead screw when the lead screw is rotated;
      drive means;
      means for engaging the lead screw with the drive means; and
      means for activating the drive means to rotate the lead screw whereby the tab engages the selected cartridge and moves the selected cartridge forward.

2. The automated storage library of claim 1, wherein the selected cell comprises a retention member to restrain within the selected cell a cartridge in the front position.

3. The automated storage library of claim 2, further comprising means for determining when the selected cartridge is in the front position.

4. The automated storage library of claim 3, wherein:
   the determining means comprises means for determining when a resistive force against the motor-driven device by the restrained selected cell is approximately equal to a predetermined force.

5. The automated storage library of claim 2, wherein the retention member comprises a tab for engaging a corresponding notch in the selected cartridge.

6. The automated storage library of claim 2, wherein the retention member comprises:
   a first tab in a first location within the selected cell for engaging a corresponding notch in the selected cartridge if the selected cartridge is of a first type; and
   a second tab in a second location within the selected cell for engaging the corresponding notch in the selected cartridge if the selected cartridge is of a second type.

7. The automated storage library of claim 1, further comprising a controller for:
   assigning a priority to each cartridge to be stored in a cell, whereby a frequently accessed cartridge has a higher priority than a less frequently accessed cartridge; and
   directing that the gripper store a cartridge with a higher priority in a position closer to the front of a cell than a cartridge with a lower priority.

8. The automated storage library of claim 7, wherein the controller further directs the gripper to store a cartridge with a higher priority in a cell which is closer to the data drive than a cartridge with a lower priority.

9. An automated data storage library with a data drive for reading/writing data from/to media within data cartridges, the library comprising:
- a plurality of multi-cartridge storage cells arranged in a two-dimensional array, each cell having a front opening and a back, data cartridges being retained in positions in a cell from a front position to a rear position, each cell further having a retention member to restrain a cartridge in the front position;
- a gripper positionable to insert cartridges into, and remove cartridges from, the front openings of the cells and transporting cartridges within the library; and
- an automated pusher device, comprising:
  - means for being positioned proximate to a selected cell;
  - a motor-driven device selectively engaged with the selected cartridge;
  - means for moving a selected cartridge in the selected cell from a first position forward to the front position; and
  - means for determining when a resistive force against the motor-driven device by the restrained selected cell is approximately equal to a predetermined force, thereby indicating that the selected cartridge is in the front position.

10. The automated storage library of claim 9, wherein the means for moving the selected cartridge comprises:
- an extendable member; and
- means for extending the extendable member into the back of the selected cell whereby the selected cartridge is moved forward.

11. The automated storage library of claim 9, wherein the motor-driven device and the means for moving a selected cartridge comprise:
- a lead screw within the selected cell and having a first end at the back of the selected cell and a second end proximate to the front opening of the selected cell;
- a tab threaded onto the lead screw and movable along the lead screw when the lead screw is rotated;
- drive means;
- means for engaging the lead screw with the drive means; and
- means for activating the drive means to rotate the lead screw whereby the tab engages the selected cartridge and moves the selected cartridge forward.

12. The automated storage library of claim 9, wherein the automated pusher device is located in a front area relative to the cells.

13. The automated storage library of claim 9, wherein the automated pusher device is located in a back area relative to the cells.

* * * * *